United States Patent
Lu et al.

(10) Patent No.: US 11,683,741 B2
(45) Date of Patent: Jun. 20, 2023

(54) SIGNALING TRANSMISSION METHOD AND APPARATUS, AND NETWORK DEVICE

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/124,073

(22) Filed: Dec. 16, 2020

(65) Prior Publication Data
US 2021/0105700 A1  Apr. 8, 2021

Related U.S. Application Data

(63) Continuation of application No. PCT/CN2018/092183, filed on Jun. 21, 2018.

(51) Int. Cl.
*H04W 40/22* (2009.01)
*H04W 92/02* (2009.01)

(52) U.S. Cl.
CPC ............ *H04W 40/22* (2013.01); *H04W 92/02* (2013.01)

(58) Field of Classification Search
CPC ... H04W 40/22; H04W 92/02; H04W 28/065; H04W 28/0252; H04W 76/27; H04L 47/10; H04L 47/14
See application file for complete search history.

(56) References Cited

U.S. PATENT DOCUMENTS

| | | | | |
|---|---|---|---|---|
| 2003/0235212 A1* | 12/2003 | Kuo | ...................... | H04W 76/27 455/13.2 |
| 2012/0140704 A1* | 6/2012 | Zhao | ...................... | H04L 1/1874 370/315 |
| 2019/0159277 A1* | 5/2019 | Zhu | ...................... | H04W 88/04 |

FOREIGN PATENT DOCUMENTS

| | | |
|---|---|---|
| CN | 102804906 | 11/2012 |
| CN | 103596213 | 2/2014 |
| CN | 105580422 | 5/2016 |
| WO | 2012060565 | 5/2012 |

OTHER PUBLICATIONS

WIPO, ISR and WO for PCT/CN2018/092183, dated Mar. 12, 2019.
Huawei, "CP Protocol Design for L2 Relaying," 3GPP TSG-RAN WG3 #100, R3-183183, May 2018.
Samsung, "Discussions on Control Plane Protocol for IAB," 3GPP TSG-RAN WG3 #99bis, R2-181875, Apr. 2018.
Intel Corporation, "Adaptation Layer and Routing for IAB in NR," 3GPP TSG RAN WG3 Meeting #100, R3-183169, May 2018.
EPO, Extended European Search Report for EP Application No. 18923531.0, dated May 25, 2021.
IPI, Office Action for IN Application No. 202117000830, dated Jan. 6, 2022.
EPO, Communication for EP Application No. 18923531.0, dated Mar. 15, 2023.

* cited by examiner

*Primary Examiner* — Jamal Javaid
(74) *Attorney, Agent, or Firm* — Hodgson Russ LLP (57) ABSTRACT

A signaling transmission method includes: transmitting, by a first network node, first signaling to a second network node, wherein the first signaling is inter-signaling between a first protocol layer and a second protocol layer, and the first protocol layer and the second protocol layer are located at different network nodes.

18 Claims, 4 Drawing Sheets

A first network node transmits first signaling to a second network node, where the first signaling is inter-layer signaling between a first protocol layer and a second protocol layer, and the first protocol layer and the second protocol layer are located in different network nodes

A second network node receives first signaling transmitted by a first network node, where the first signaling is inter-layer signaling between a first protocol layer and a second protocol layer, and the first protocol layer and the second protocol layer are located in different network nodes

SIGNALING TRANSMISSION METHOD AND APPARATUS, AND NETWORK DEVICE

CROSS-REFERENCE TO RELATED APPLICATION

This application is a continuation of International Application No. PCT/CN2018/092183, filed on Jun. 21, 2018, the entire disclosure of which is incorporated herein by reference.

TECHNICAL FIELD

The present disclosure relates to the field of wireless communication technologies, and in particular to a signaling transmission method and device, and a network device.

BACKGROUND

In a New Radio (NR) system, one of research subjects of the 3rd Generation Partnership Project (3GPP) is wireless relay. Specifically, a relay node (RN) is wireless connected to its anchor base station which is also referred to as a donor. A terminal can be directly connected to the donor or indirectly connected to the donor through one or more relay nodes. NR has the following requirements for the wireless relay: 1) a requirement for supporting multi-hop transmission from a fixed node to a relay node, 2) a requirement for supporting redundant path transmission from the fixed node to the relay node, and 3) a requirement for supporting automatic configuration of a backbone path from the relay node to the fixed node.

Compared with the traditional single-hop interface from User Equipment (UE) to a base station, the wireless relay architecture differs in that when a Protocol Data Unit (PDU) packet of a Packet Data Convergence Protocol (PDCP) is transmitted from a transmitting end (such as the donor or the UE), even if the data packet is correctly transmitted to a next-hop network node, it may actually still not be correctly received by a receiving end (such as the UE or the donor). In the traditional single-hop interface between the UE and the base station, the PDCP layer obtains RLC transmission status through an ARQ status report of the packet on a Radio Link Control (RLC) layer, thereby triggering corresponding data recovery and reestablishment processes. As described above, in the relay network architecture, if the RLC transmission status cannot be correctly obtained by the PDCP layer, the implementation of the data recovery process and the reestablishment process will be affected.

In addition, for PDCP discard, in the current traditional single-hop interface between the UE and the base station, the PDCP layer can directly instruct the RLC layer to discard a data packet, but under the wireless relay architecture, the PDCP layer and the RLC layer are located in different network nodes which are separated by an adaptation layer, and how to implement the inter-layer interaction is necessary to be solved.

SUMMARY

A signaling transmission method is provided by the embodiments of the present disclosure, which includes:
transmitting, by a first network node, first signaling to a second network node, where the first signaling is inter-layer signaling between a first protocol layer and a second protocol layer, and the first protocol layer and the second protocol layer are located in different network nodes.

In an embodiment, the first network node is a first relay node, and the second network node is an anchor base station; the first network node is the anchor base station, and the second network node is the first relay node; or the first network node is the first relay node, and the second network node is a second relay node.

In an embodiment, the first relay node is a relay node serving a terminal, or the second relay node is the relay node serving the terminal.

In an embodiment, the first relay node is a relay node serving a terminal, and the second relay node is a relay node directly connected to the anchor base station, or the second relay node is the relay node serving the terminal, and the first relay node is the relay node directly connected to the anchor base station.

In an embodiment, the first relay node is a source relay node serving a terminal, and the second relay node is a target relay node serving the terminal, or the second relay node is the source relay node serving the terminal, and the first relay node is the target relay node serving the terminal.

In an embodiment, the first signaling includes data transmission information of a RLC layer. In an example, the data transmission information of the RLC layer includes at least one of the following:
sequence number information of a correctly transmitted PDCP PDU;
sequence number information of a correctly received PDCP PDU;
bearer identification information;
bearer type information; and
logical channel identification information.

In an embodiment, the first signaling includes control instructions for instructing to discard a PDCP data packet. In an example, the control instructions include at least one of the following information:
sequence number information of a to-be-discarded PDCP PDU;
bearer identification information;
bearer type information; and
logical channel identification information.

In an embodiment, the first signaling is transmitted through an adaptation layer; or
the first signaling is transmitted through a F1AP application protocol.

A signaling transmission method is provided by the embodiments of the present disclosure, which includes:
receiving, by a second network node, first signaling transmitted by a first network node, where the first signaling is inter-layer signaling between a first protocol layer and a second protocol layer, and the first protocol layer and the second protocol layer are located in different network nodes.

In an embodiment, the first network node is a first relay node, and the second network node is an anchor base station; the first network node is the anchor base station, and the second network node is the first relay node; or the first network node is the first relay node, and the second network node is a second relay node.

In an embodiment, the first relay node is a relay node serving a terminal, or the second relay node is the relay node serving the terminal.

In an embodiment, the first relay node is a relay node serving a terminal, and the second relay node is a relay node directly connected to the anchor base station, or the second relay node is the relay node serving the terminal, and the first relay node is the relay node directly connected to the anchor base station.

In an embodiment, the first relay node is a source relay node serving a terminal, and the second relay node is a target relay node serving the terminal, or the second relay node is the source relay node serving the terminal, and the first relay node is the target relay node serving the terminal.

In an embodiment, the first signaling includes data transmission information of a RLC layer. In an example, the data transmission information of the RLC layer includes at least one of the following:
sequence number information of a correctly transmitted PDCP PDU;
sequence number information of a correctly received PDCP PDU;
bearer identification information;
bearer type information; and
logical channel identification information.

In an embodiment, the first signaling includes control instructions for instructing to discard a PDCP data packet. In an example, the control instructions include at least one of the following information:
sequence number information of a to-be-discarded PDCP PDU;
bearer identification information;
bearer type information; and
logical channel identification information.

In an embodiment, the first signaling is transmitted through an adaptation layer; or
the first signaling is transmitted through F1AP.

A signaling transmission device is provided by the embodiments of the present disclosure, which is applied to a first network node, and the device includes:
a transmitting unit configured to transmit first signaling to a second network node, where the first signaling is inter-layer signaling between a first protocol layer and a second protocol layer, and the first protocol layer and the second protocol layer are located in different network nodes.

In an embodiment, the first network node is a first relay node, and the second network node is an anchor base station;
the first network node is the anchor base station, and the second network node is the first relay node; or
the first network node is the first relay node, and the second network node is a second relay node.

In an embodiment, the first relay node is a relay node serving a terminal, or the second relay node is the relay node serving the terminal.

In an embodiment, the first relay node is the relay node serving a terminal, and the second relay node is a relay node directly connected to the anchor base station, or the second relay node is the relay node serving the terminal, and the first relay node is the relay node directly connected to the anchor base station.

In an embodiment, the first relay node is a source relay node serving a terminal, and the second relay node is a target relay node serving the terminal, or the second relay node is the source relay node serving the terminal, and the first relay node is the target relay node serving the terminal.

In an embodiment, the first signaling includes data transmission information of a RLC layer. In an example, the data transmission information of the RLC layer includes at least one of the following:
sequence number information of a correctly transmitted PDCP PDU;
sequence number information of a correctly received PDCP PDU;
bearer identification information;
bearer type information; and
logical channel identification information.

In an embodiment, the first signaling includes control instructions for instructing to discard a PDCP data packet. In an example, the control instructions include at least one of the following information:
sequence number information of a to-be-discarded PDCP PDU;
bearer identification information;
bearer type information; and
logical channel identification information.

In an embodiment, the first signaling is transmitted through an adaptation layer; or,
the first signaling is transmitted through a F1AP application protocol.

A signaling transmission device is provided by the embodiment of the present disclosure, which is applied to a second network node, and the device includes:
a receiving unit configured to receive first signaling transmitted by a first network node, where the first signaling is inter-layer signaling between a first protocol layer and a second protocol layer, and the first protocol layer and the second protocol layer are located in different network nodes.

In an embodiment, the first network node is a first relay node, and the second network node is an anchor base station;
the first network node is the anchor base station, and the second network node is the first relay node; or
the first network node is the first relay node, and the second network node is a second relay node.

In an embodiment, the first relay node is a relay node serving a terminal, or the second relay node is the relay node serving the terminal.

In an embodiment, the first relay node is a relay node serving a terminal, and the second relay node is a relay node directly connected to the anchor base station, or the second relay node is the relay node serving the terminal, and the first relay node is the relay node directly connected to the anchor base station.

In an embodiment, the first relay node is a source relay node serving a terminal, and the second relay node is a target relay node serving the terminal, or the second relay node is the source relay node serving the terminal, and the first relay node is the target relay node serving the terminal.

In an embodiment, the first signaling includes data transmission information of a RLC layer. In an example, the data transmission information of the RLC layer includes at least one of the following:
sequence number information of a correctly transmitted PDCP PDU;
sequence number information of a correctly received PDCP PDU;
bearer identification information;
bearer type information; and
logical channel identification information.

In an embodiment, the first signaling includes control instructions for instructing to discard a PDCP data packet. In an example, the control instructions include at least one of the following information:
sequence number information of a to-be-discarded PDCP PDU;
bearer identification information;
bearer type information; and
logical channel identification information.

In an embodiment, the first signaling is transmitted through an adaptation layer; or
the first signaling is transmitted through F1AP.

A network device is provided by the embodiments of the present disclosure, which includes a processor and a memory for storing a computer program, where the processor is configured to revoke and run the computer program stored in the memory to perform any of the aforementioned signaling transmissions methods.

A chip is provided by the embodiments of the present disclosure, which includes a processor configured to revoke and run a computer program from a memory to cause a device provided with the chip to perform any of the aforementioned signaling transmission methods.

A computer-readable storage medium is provided by the embodiments of the present disclosure, which stores a computer program causing a computer to perform any of the aforementioned signaling transmission methods.

A computer program product is provided by the embodiments of the present disclosure, which includes computer program instructions that cause a computer to perform any of the aforementioned signaling transmission methods.

A computer program is provided by the embodiments of the present disclosure, which causes a computer to perform any of the aforementioned signaling transmission methods.

BRIEF DESCRIPTION OF THE DRAWINGS

The accompanying drawings described herein are used to provide a further understanding of the present disclosure and constitute a part of the present disclosure. The exemplary embodiments of the present disclosure and the description thereof are used to explain the present disclosure, and do not constitute an improper limitation of the present disclosure. In the drawings.

DETAILED DESCRIPTION

Technical solutions in embodiments of the present disclosure are described below in connection with the accompanying drawings in the embodiments of the present disclosure. Obviously, the described embodiments are part of the embodiments of the present disclosure, but not all the embodiments. Based on the embodiments in the present disclosure, all other embodiments obtained by a person of ordinary skill in the art without creative work fall within the protection scope of the present disclosure.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Universal Mobile Telecommunication System (UMTS), a Global Interoperability for Microwave Access (WiMAX) communication system, a 5G system, or the like.

Figure 1:
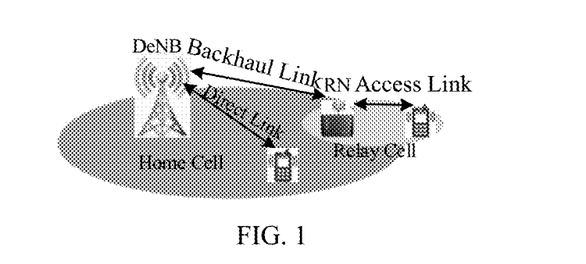
FIG. 1 is a schematic diagram of a communication system to which an embodiment of the present disclosure is applied.

For example, FIG. 1 shows a communications system 100 to which an embodiment of the present disclosure is applied. The RN is wirelessly connected to its donor. The communication system includes three wireless links:

1. a backhaul link between the RN and the donor;
2. an access link between the UE and the RN; and
3. a direct link between the UE and the donor.

FIG. 1 exemplarily shows one RN. Optionally, the UE may be indirectly connected to the donor through multiple RNs, which is not limited in the embodiments of the present disclosure.

Optionally, the communication system 100 may also include other network entities such as a network controller and a mobility management entity, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

Figure 2:
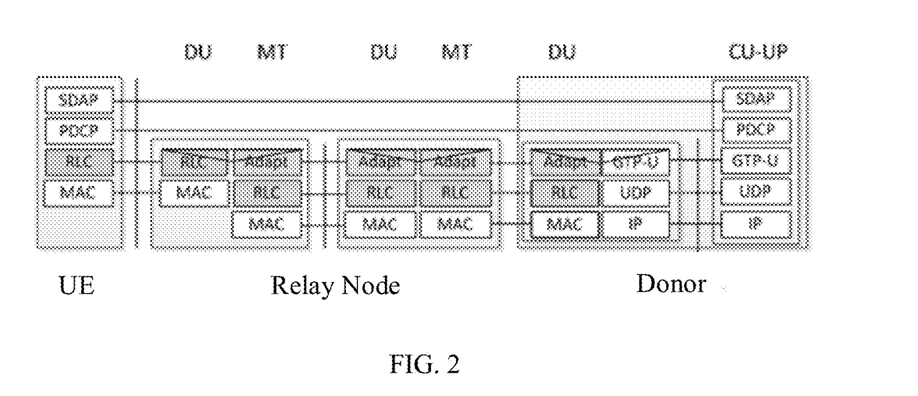
FIG. 2 is a schematic diagram of a protocol implementation in a wireless relay architecture.

FIG. 2 shows a protocol implementation of a wireless relay architecture. As shown in FIG. 2, the protocols of the UE side are shown on the leftmost, the protocols of the donor side are shown on the rightmost, and the protocols of the relay nodes are shown in the middle. The protocols of two relay nodes are illustrated in FIG. 2, but the present disclosure is not limited to this, and there can be other number of relay nodes between the UE and the donor. In the protocols of the wireless relay architecture, the UE and the donor implement end-to-end communication on the PDCP layer, and implement point-to-point communication on the RLC layer. Further, a multi-hop routing and forwarding function is realized by using an adaptation layer. Under the wireless relay architecture, the PDCP layer and the RLC layer are located in different network nodes, and are separated by one adaptation layer. The interaction problem between the PDCP layer and the RLC layer is addressed by the embodiments of the present disclosure.

Figure 3:
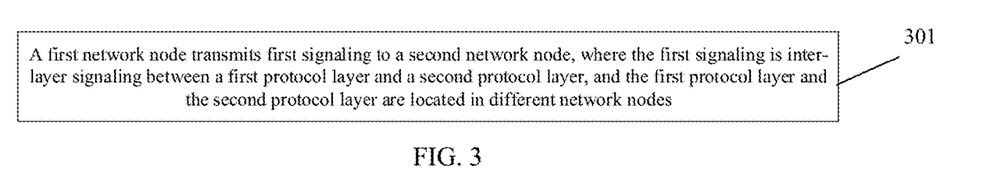
FIG. 3 is a first flowchart of a signaling transmission method according to an embodiment of the present disclosure.

FIG. 3 is a first schematic flow chart of a signaling transmission method according to an embodiment of the present disclosure. As shown in FIG. 3, the signaling transmission method includes the following steps.

In step 301, a first network node transmits first signaling to a second network node, where the first signaling is inter-layer signaling between a first protocol layer and a second protocol layer, and the first protocol layer and the second protocol layer are located in different network nodes.

In the embodiments of the present disclosure, the first signaling can be applied between the relay nodes, or between the relay node and the donor. Herein, the relay node can be a common IAB-node, and the donor can be an IAB-donor. Specifically, there can be the following situations.

1) The first network node is a first relay node, and the second network node is a donor. For example, the first network node is a first IAB-node, and the second network node is an IAB-donor.

2) The first network node is the donor, and the second network node is the first relay node. For example, the first network node is the IAB-donor, and the second network node is the first IAB-node.

3) The first network node is the first relay node, and the second network node is a second relay node. For example, the first network node is the first IAB-node, and the second network node is a second IAB-node. For another example, the first network node is the second IAB-node, and the second network node is the first IAB-node.

In an embodiment, the first relay node is a relay node serving a terminal, or the second relay node is the relay node serving the terminal.

In an embodiment, the first relay node is the relay node serving the terminal, and the second relay node is a relay node directly connected to the donor. Alternatively, the second relay node is the relay node serving the terminal, and the first relay node is the relay node directly connected to the donor.

In an embodiment, the first relay node is a source relay node serving the terminal, and the second relay node is a target relay node serving the terminal. Alternatively, the second relay node is the source relay node serving the terminal, and the first relay node is the target relay node serving the terminal.

In an embodiment of the present disclosure, the first signaling includes data transmission information of the RLC layer (which is used to indicate data transmission status of the RLC layer), and the data transmission information of the RLC layer includes at least one of the following:

sequence number information of a correctly transmitted PDCP PDU;

sequence number information of a correctly received PDCP PDU;

bearer identification (bearer ID);

bearer type information; and

Logical Channel Identification Information (LCID).

Herein, the bearer type indicates data bearer (DRB) or signaling bearer (SRB).

Herein, the data transmission information of the RLC layer is reported to the PDCP layer by the RLC layer between different network nodes.

In an embodiment of the present disclosure, the first signaling includes control instructions for instructing to discard a PDCP data packet. In an example, the control instructions include at least one of the following information:

sequence number information of a to-be-discarded PDCP PDU;

bearer identification information;

bearer type information; and logical channel identification information.

Herein, the control instructions for instructing to discard the PDCP data packet is transmitted to the RLC layer by the PDCP layer between different network nodes.

In the embodiments of the present disclosure, the first signaling may be transmitted in the following manners.

1) The first signaling is transmitted through the adaptation layer; or 2) the first signaling is transmitted through F1AP.

Figure 4:
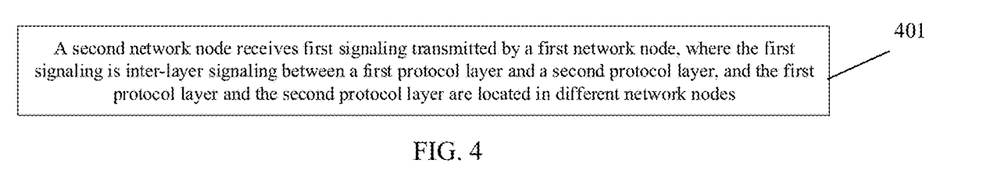
FIG. 4 is a second flowchart of a signaling transmission method according to an embodiment of the present disclosure.

FIG. 4 is a second schematic flow chart of a signaling transmission method according to an embodiment of the present disclosure. As shown in FIG. 4, the signaling transmission method includes the following steps.

In step 401, a second network node receives first signaling transmitted by a first network node, where the first signaling is inter-layer signaling between a first protocol layer and a second protocol layer, and the first protocol layer and the second protocol layer are located in different network nodes.

In the embodiments of the present disclosure, the first signaling can be applied between the relay nodes, or between the relay node and the donor. Herein, the relay node can be a common IAB-node, and the donor can be an IAB-donor. Specifically, there can be the following situations.

1) The first network node is a first relay node, and the second network node is a donor. For example, the first network node is a first IAB-node, and the second network node is an IAB-donor.

2) The first network node is the donor, and the second network node is the first relay node. For example, the first network node is the IAB-donor, and the second network node is the first IAB-node.

3) The first network node is the first relay node, and the second network node is a second relay node. For example, the first network node is the first IAB-node, and the second network node is a second IAB-node. For another example, the first network node is the second IAB-node, and the second network node is the first IAB-node.

In an embodiment, the first relay node is a relay node serving a terminal. Alternatively, the second relay node is the relay node serving the terminal.

In an embodiment, the first relay node is the relay node serving the terminal, and the second relay node is a relay node directly connected to the donor. Alternatively, the second relay node is the relay node serving the terminal, and the first relay node is the relay node directly connected to the donor.

In an embodiment, the first relay node is a source relay node serving the terminal, and the second relay node is a target relay node serving the terminal. Alternatively, the second relay node is the source relay node serving the terminal, and the first relay node is the target relay node serving the terminal.

In an embodiment of the present disclosure, the first signaling includes data transmission information of the RLC layer (which is used to indicate data transmission status of the RLC layer), and the data transmission information of the RLC layer includes at least one of the following:

sequence number information of a correctly transmitted PDCP PDU;

sequence number information of a correctly received PDCP PDU;

bearer identification (bearer ID);

bearer type information; and logical channel identification information.

Herein, the bearer type indicates data bearer (DRB) or signaling bearer (SRB).

Herein, the data transmission information of the RLC layer is reported to the PDCP layer by the RLC layer between different network nodes.

In an embodiment of the present disclosure, the first signaling includes control instructions for instructing to discard a PDCP data packet. In an example, the control instructions include at least one of the following information:

sequence number information of a to-be-discarded PDCP PDU;

bearer identification information;

bearer type information; and logical channel identification information.

Herein, the control instructions for instructing to discard the PDCP data packet is transmitted to the RLC layer by the PDCP layer between different network nodes.

In the embodiments of the present disclosure, the first signaling may be transmitted in the following manners.

1) The first signaling is transmitted through the adaptation layer; or 2) the first signaling is transmitted through F1AP.

The technical solutions of the embodiments of the present disclosure will be illustrated below in connection with specific application examples.

First application instance: for uplink transmission, the RLC layer reports the data transmission information of the RLC layer to the PDCP layer through the first signaling 1) The PDCP PDU is transmitted to the RLC layer of the UE by the UE, and after being processed by the RLC layer, it is transmitted to the IAB-node serving the UE.

2) The IAB-node correctly receives the RLC PDU generated by the RLC SDU/PDCP PDU (and other RLC SDUs/PDCP PDUs), but does not immediately feedback an ACK, and further transmits the RLC SDU/PDCP PDU to a next higher level IAB-Node/IAB-donor.

3) After the IAB-donor correctly receives the PDCP PDU/RLC SDU,
the IAB-donor transmits signaling to the IAB-node serving the UE to feedback the data transmission information of the RLC layer; or
the IAB-node directly connected to the IAB-donor transmits signaling to the IAB-node serving the UE to feedback the data transmission information of the RLC layer,
where the signaling is transmitted by F1AP or the adaptation layer.

4) The IAB-node serving the UE receives the signaling (including all RLC SDUs/PDCP PDUs corresponding to the RLC PDU) and feeds back the ACK to the UE.

Second application instance: for downlink transmission, the RLC layer reports the data transmission information of the RLC layer to the PDCP layer through the first signaling 1) The PDCP PDU is transmitted to the RLC layer of the IAB-donor by the IAB-donor, and after being processed by the RLC layer, it is transmitted to the IAB-node directly connected to the IAB-donor.

2) The IAB-node directly connected to the IAB-donor correctly receives the RLC PDU generated by the RLC SDU/PDCP PDU (and other RLC SDUs/DCP PDUs), and optionally, without immediately feeding back an ACK, further transmits the RLC SDU/PDCP PDU to a next lower level IAB-node.

3) After the UE correctly receives the PDCP PDU/RLC SDU,
the IAB-node serving the UE transmits signaling to the IAB-donor to feedback the RLC transmission status; or
the IAB-node serving the UE transmits signaling to the IAB-node directly connected to the IAB-donor to feedback the RLC transmission status, and then the IAB-node directly connected to the IAB-donor transmits signaling to the IAB-donor to feedback the ACK,
where the signaling is transmitted by F1AP or the adaptation layer.

Third application instance: for downlink transmission, the PDCP layer instructs the RLC layer to discard the PDCP data packet through the first signaling 1) The IAB-donor transmits the PDCP PDU to the RLC layer of the IAB-donor.

Optionally, after being processed by the RLC layer, the PDCP PDU is transmitted to the IAB-node directly connected to the IAB-donor.

2) A discard timer of the IAB-donor expires, and a discard command is transmitted to at least one IAB-node that transmits data to the target UE.

3) When the IAB-node receives the discard command, the data is discarded if it is not transmitted to the lower layer.

Figure 5:
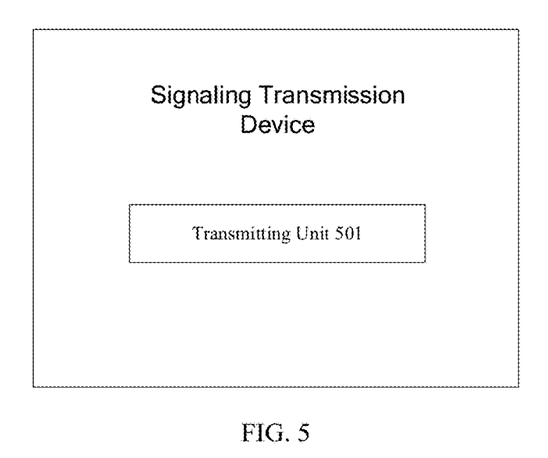
FIG. 5 is a first schematic diagram of a structure of a signaling transmission device according to an embodiment of the present disclosure.

FIG. 5 is a first schematic diagram showing a structure of a signaling transmission device according to an embodiment of the present disclosure, which is applied to a first network node. As shown in FIG. 5, the signaling transmission device includes:
a transmitting unit 501 configured to transmit first signaling to a second network node, where the first signaling is inter-layer signaling between a first protocol layer and a second protocol layer, and the first protocol layer and the second protocol layer are located in different network nodes.

In an embodiment, the first network node is a first relay node, and the second network node is a donor.

Alternatively, the first network node is the donor, and the second network node is the first relay node.

Alternatively, the first network node is the first relay node, and the second network node is a second relay node.

In an embodiment, the first relay node is a relay node serving a terminal. Alternatively, the second relay node is the relay node serving the terminal.

In an embodiment, the first relay node is the relay node serving the terminal, and the second relay node is a relay node directly connected to the donor. Alternatively, the second relay node is the relay node serving the terminal, and the first relay node is the relay node directly connected to the donor.

In an embodiment, the first relay node is a source relay node serving the terminal, and the second relay node is a target relay node serving the terminal. Alternatively, the second relay node is the source relay node serving the terminal, and the first relay node is the target relay node serving the terminal.

In an implementation, the first signaling includes the data transmission information of the RLC layer. In an example, the data transmission information of the RLC layer includes at least one of the following:
sequence number information of a correctly transmitted PDCP PDU;
sequence number information of a correctly received PDCP PDU;
bearer identification information;
bearer type information; and
logical channel identification information.

In an embodiment, the first signaling includes control instructions for instructing to discard a PDCP data packet. In an example, the control instructions include at least one of the following information:
sequence number information of a to-be-discarded PDCP PDU;
bearer identification information;
bearer type information; and
logical channel identification information.

In an embodiment, the first signaling is transmitted through the first signaling through the adaptation layer.

Alternatively, the first signaling is transmitted through a F1AP application protocol.

Those skilled in the art should understand that the functions implemented by the units in the signaling transmission device shown in FIG. 5 can be understood by referring to the related description of the foregoing signaling transmission method. The functions of the units in the signaling transmission device shown in FIG. 5 can be realized by a program executed by a processor, or by a specific logic circuit.

Figure 6:
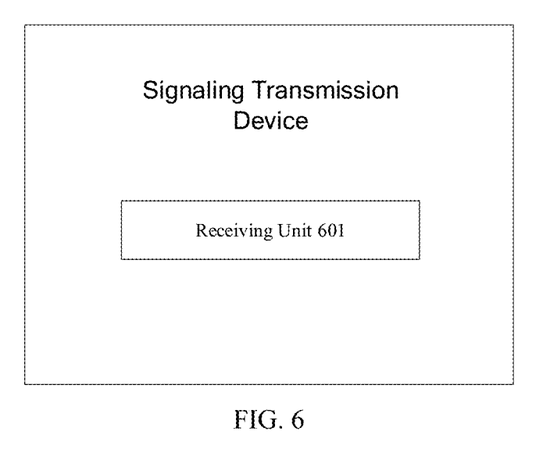
FIG. 6 is a second schematic diagram of a structure of a signaling transmission device according to an embodiment of the present disclosure.

FIG. 6 is a second schematic diagram showing a structure of a signaling transmission device according to an embodiment of the present disclosure, which is applied to a second network node. As shown in FIG. 6, the signaling transmission device includes:

a receiving unit 601 configured to receive first signaling transmitted by a first network node, where the first signaling is inter-layer signaling between a first protocol layer and a second protocol layer, and the first protocol layer and the second protocol layer are located in different network nodes.

In an embodiment, the first network node is a first relay node, and the second network node is a donor.

Alternatively, the first network node is the donor, and the second network node is the first relay node.

Alternatively, the first network node is the first relay node, and the second network node is a second relay node.

In an embodiment, the first relay node is a relay node serving a terminal. Alternatively, the second relay node is the relay node serving the terminal.

In an embodiment, the first relay node is the relay node serving the terminal, and the second relay node is a relay node directly connected to the donor. Alternatively, the second relay node is the relay node serving the terminal, and the first relay node is the relay node directly connected to the donor.

In an embodiment, the first relay node is a source relay node serving the terminal, and the second relay node is a target relay node serving the terminal. Alternatively, the second relay node is the source relay node serving the terminal, and the first relay node is the target relay node serving the terminal.

In an implementation, the first signaling includes the data transmission information of the RLC layer. In an example, the data transmission information of the RLC layer includes at least one of the following:

sequence number information of a correctly transmitted PDCP PDU;

sequence number information of a correctly received PDCP PDU;

bearer identification information;

bearer type information; and logical channel identification information.

In an embodiment, the first signaling includes control instructions for instructing to discard a PDCP data packet. In an example, the control instructions include at least one of the following information:

sequence number information of a to-be-discarded PDCP PDU;

bearer identification information;

bearer type information; and logical channel identification information.

In an embodiment, the first signaling is transmitted through the first signaling through the adaptation layer.

Alternatively, the first signaling is transmitted through F1AP.

Those skilled in the art should understand that the functions implemented by the units in the signaling transmission device shown in FIG. 6 can be understood by referring to the related description of the foregoing signaling transmission method. The functions of the units in the signaling transmission device shown in FIG. 6 can be implemented by a program executed by a processor, or by a specific logic circuit.

Figure 7:
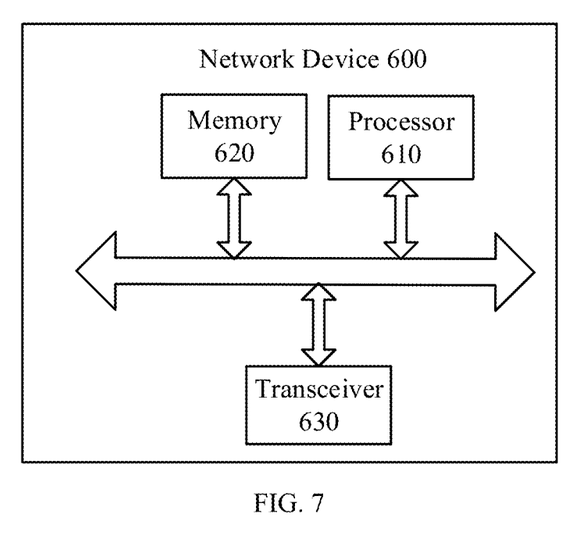
FIG. 7 is a schematic structural diagram of a network device according to an embodiment of the present disclosure.

FIG. 7 is a schematic structural diagram of a network device 600 according to an embodiment of the present disclosure. The network device 600 shown in FIG. 7 includes a processor 610 which can revoke and run a computer program from a memory to implement the methods in the embodiments of the present disclosure.

Optionally, as shown in FIG. 7, the network device 600 can further include a memory 620. The processor 610 can invoke and run the computer program from the memory 620 to perform the methods in the embodiments of the present disclosure.

The memory 620 can be a separate device independent of the processor 610, or can be integrated in the processor 610.

Optionally, as shown in FIG. 7, the network device 600 can further include a transceiver 630, and the processor 610 can control the transceiver 630 to communicate with other devices. Specifically, it can transmit information or data to other devices, or receive information or data transmitted from other devices.

The transceiver 630 can include a transmitter and a receiver. The transceiver 630 can further include one or more antennas.

Optionally, the network device 600 can specifically be the network device in the embodiments of the present disclosure, and the network device 600 can implement the corresponding processes which are implemented by the network device in the methods of the embodiments of the present disclosure. For the sake of brevity, a repeated description is omitted here.

Optionally, the network device 600 can specifically be the mobile terminal/terminal device in the embodiments of the present disclosure, and the network device 600 can implement the corresponding processes which are implemented by the mobile terminal/terminal device in the methods of the embodiments of the present disclosure. For the sake of brevity, a repeated description will be omitted here.

Figure 8:
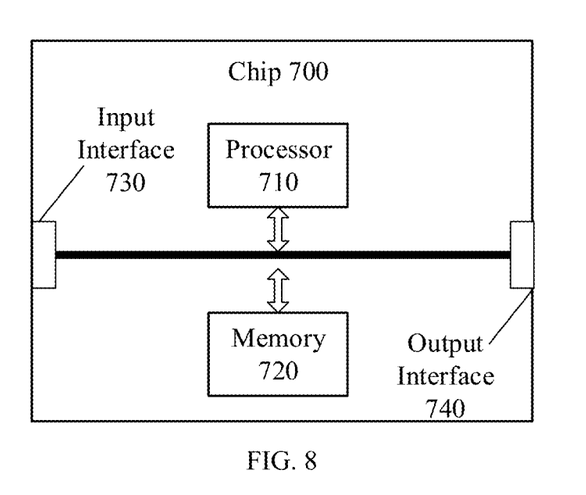
FIG. 8 is a schematic structural diagram of a chip according to an embodiment of the present disclosure.

FIG. 8 is a schematic structural diagram of a chip in an embodiment of the present disclosure. The chip 700 shown in FIG. 8 includes a processor 710 which can invoke and run a computer program from a memory to implement the methods in the embodiments of the present disclosure.

Optionally, as shown in FIG. 8, the chip 700 can further include a memory 720. The processor 710 can invoke and run the computer program from the memory 720 to implement the methods in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip can be applied to the network device in the embodiments of the present disclosure, and can implement the corresponding processes which are implemented by the network device in the methods of the embodiments of the present disclosure. For the sake of brevity, a repeated description will be omitted here.

Optionally, the chip can be applied to the mobile terminal/terminal device in the embodiments of the present disclosure, and can implement the corresponding processes which are implemented by the mobile terminal/terminal device in the methods of the embodiments of the present disclosure. For the sake of brevity, a repeated description will be omitted here.

It should be understood that the chip mentioned in the embodiments of the present disclosure can also be referred to as a system-level chip, a system chip, a chip system, or a system-on-chip.

Figure 9:
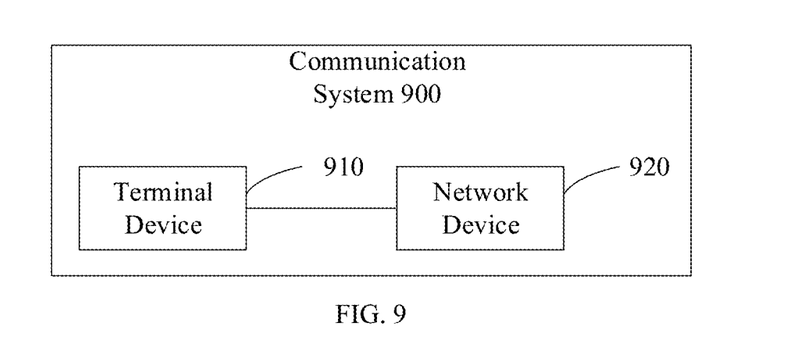
FIG. 9 is a schematic block diagram of a communication system according to an embodiment of the present disclosure.

FIG. 9 is a schematic block diagram of a communication system 900 according to an embodiment of the present disclosure. As shown in FIG. 9, the communication system 900 includes a terminal device 910 and a network device 920.

The terminal device 910 can be configured to implement the corresponding functions implemented by the terminal device in the above methods, and the network device 920 can be configured to implement the corresponding functions implemented by the network device in the above methods. For the sake of brevity, a repeated description is omitted here.

It should be understood that the processor in the embodiments of the present disclosure can be an integrated circuit chip that has signal processing capabilities. In implementations, the steps of the foregoing method embodiments can be performed by an integrated logic circuit of hardware in the processor or instructions in a form of software. The foregoing processor can be a general-purpose processor, a Digital Signal Processor (DSP), an Application Specific Integrated Circuit (ASIC), a Field Programmable Gate Array (FPGA), or another programmable logic device, discrete gate or transistor logic device, or discrete hardware component. The methods, steps, and logical blocks disclosed in the embodiments of the present disclosure can be implemented or performed. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure can be a volatile memory or a non-volatile memory, or both. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM), which is used as an external cache. By way of example but not limitation, many forms of RAM are available, such as a Static RAM (SRAM), a Dynamic RAM (DRAM), a Synchronous DRAM (SDRAM), a Double SDRAM (DDR SDRAM), an Enhanced SDRAM (ESDRAM), a Synch-Link DRAM (SLDRAM) and a Direct Rambus RAM (DR RAM). It should be noted that the memories of the systems and methods described herein are intended to include, but are not limited to those and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure. For the sake of brevity, a repeated description is omitted here.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure. For the sake of brevity, a repeated description is omitted here.

The embodiments of the present disclosure also provide a computer program product including computer program instructions.

Optionally, the computer program product can be applied to the network device in the embodiments of the present disclosure, and the computer program instructions cause a computer to perform the corresponding processes which are implemented by the network device in the methods of the embodiments of the present disclosure. For the sake of brevity, a repeated description is omitted here.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure. For the sake of brevity, a repeated description is omitted here.

The embodiments of the present disclosure also provides a computer program.

Optionally, the computer program can be applied to the network device in the embodiments of the present disclosure, and when being executed on a computer, the computer program causes the computer to perform the corresponding processes which are implemented by the network device in the methods of the embodiments of the present disclosure. For the sake of brevity, a repeated description is omitted here.

Optionally, the computer program can be applied to the mobile terminal/terminal device in the embodiments of the present disclosure, and when being executed on a computer, the computer program causes the computer to perform the corresponding processes which are implemented by the mobile terminal/terminal device in the methods of the embodiments of the present disclosure. For the sake of brevity, a repeated description is omitted here.

In the technical solutions of the embodiments of the present disclosure, the inter-layer interaction between the RLC layer and the PDCP layer can be implemented between the relay nodes or between the relay node and the donor through the designed first signaling, so that the PDCP layer can correctly learn the transmission status of the RLC layer, and the PDCP layer can also instruct the RLC layer to discard the data packet.

Those of ordinary skill in the art can recognize that the exemplary units and algorithm steps described in connection with the embodiments disclosed herein can be implemented in electronic hardware, or a combination of computer software and the electronic hardware. Whether these functions are implemented in hardware or software depends on the specific application of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

According to the embodiments provided in the present disclosure, it should be understood that the systems, devices, and methods disclosed can be implemented in other manners. For example, the device embodiments described above are merely illustrative. For example, the division of the units is only a logical function division, and in actual implementations, there can be other divisions. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may or may not be physically separated, and the components shown as units may or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into a processing unit, or can individually exist physically, or two or more of the units can be integrated into one unit.

If implemented in the form of software functional units and sold or used as an independent product, the functions can be stored in a computer-readable storage medium. Based on such an understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be defined by the claims.

What is claimed is:

1. A signaling transmission method, comprising:
transmitting, by a first network node, first signaling to a second network node, wherein the first signaling is inter-layer signaling between a first protocol layer and a second protocol layer, and the first protocol layer and the second protocol layer are different and are located in different network nodes;
wherein one of the following:
the first network node is a first relay node, and the second network node is an anchor base station;
the first network node is the anchor base station, and the second network node is the first relay node; and
the first network node is the first relay node, and the second network node is a second relay node.

2. The method according to claim 1, wherein:
the first relay node is a relay node serving a terminal; or
the second relay node is the relay node serving the terminal.

3. The method according to claim 1, wherein:
the first relay node is a relay node serving a terminal, and the second relay node is a relay node directly connected to the anchor base station; or
the second relay node is the relay node serving the terminal, and the first relay node is the relay node directly connected to the anchor base station.

4. The method according to claim 1, wherein:
the first relay node is a source relay node serving a terminal, and the second relay node is a target relay node serving the terminal; or
the second relay node is the source relay node serving the terminal, and the first relay node is the target relay node serving the terminal.

5. The method according to claim 1, wherein the first signaling includes data transmission information of a Radio Link Control (RLC) layer.

6. The method according to claim 5, wherein the data transmission information of the RLC layer comprises at least one of the following:
sequence number information of a correctly transmitted Packet Data Convergence Protocol (PDCP) Protocol Data Unit (PDU);
sequence number information of a correctly received PDCP PDU;
bearer identification information;
bearer type information; and
logical channel identification information.

7. The method according to claim 1, wherein the first signaling comprises control instructions for instructing to discard a PDCP data packet.

8. The method according to claim 7, wherein the control instructions comprise at least one of the following information:
sequence number information of a to-be-discarded PDCP PDU;
bearer identification information;
bearer type information; and
logical channel identification information.

9. The method according to claim 1, wherein:
the first signaling is transmitted through an adaptation layer; or
the first signaling is transmitted through a F1AP application protocol.

10. A signaling transmission device applied to a first network node, the device comprising:
a processor; and
a memory for storing a computer program, wherein the processor is configured to revoke and run the computer program stored in the memory to cause the network device to transmit first signaling to a second network node, wherein the first signaling is inter-layer signaling between a first protocol layer and a second protocol layer, and the first protocol layer and the second protocol layer are different and are located in different network nodes; and wherein one of the following:
- the first network node is a first relay node, and the second network node is an anchor base station;
- the first network node is the anchor base station, and the second network node is the first relay node; and
- the first network node is the first relay node, and the second network node is a second relay node.

11. The device according to claim 10, wherein:
the first relay node is a relay node serving a terminal; or
the second relay node is the relay node serving the terminal.

12. The device according to claim 10, wherein:
the first relay node is a relay node serving a terminal, and the second relay node is a relay node directly connected to the anchor base station; or
the second relay node is the relay node serving the terminal, and the first relay node is the relay node directly connected to the anchor base station.

13. The device according to claim 10, wherein:
the first relay node is a source relay node serving a terminal, and the second relay node is a target relay node serving the terminal; or
the second relay node is the source relay node serving the terminal, and the first relay node is the target relay node serving the terminal.

14. The device according to claim 10, wherein the first signaling comprises data transmission information of a Radio Link Control (RLC) layer.

15. The device according to claim 14, wherein the data transmission information of the RLC layer comprises at least one of the following:
- sequence number information of a correctly transmitted Packet Data Convergence Protocol (PDCP) Protocol Data Unit (PDU);
- sequence number information of a correctly received PDCP PDU;
- bearer identification information;
- bearer type information; and
- logical channel identification information.

16. The device according to claim 10, wherein the first signaling comprises control instructions for instructing to discard a PDCP data packet.

17. The device of claim 16, wherein the control instructions comprise at least one of the following information:
- sequence number information of a to-be-discarded PDCP PDU;
- bearer identification information;
- bearer type information; and
- logical channel identification information.

18. A non-transitory computer-readable storage medium for storing a computer program that causes a computer to perform:
transmitting, by a first network node, first signaling to a second network node, wherein the first signaling is inter-layer signaling between a first protocol layer and a second protocol layer, and the first protocol layer and the second protocol layer are different and are located in different network nodes; and
wherein one of the following:
- the first network node is a first relay node, and the second network node is an anchor base station;
- the first network node is the anchor base station, and the second network node is the first relay node; and
- the first network node is the first relay node, and the second network node is a second relay node.

\* \* \* \* \*